(12) United States Patent
Yin

(10) Patent No.: US 8,235,773 B2
(45) Date of Patent: Aug. 7, 2012

(54) DUST-DISPOSAL ASSEMBLY FOR MACHINE TOOL

(75) Inventor: Shiau-Wei Yin, Taiping (TW)

(73) Assignee: IDI Precision Machinery Ltd., Taiping, Taichung County (TW)

( * ) Notice: Subject to any disclaimer, the term of this patent is extended or adjusted under 35 U.S.C. 154(b) by 1020 days.

(21) Appl. No.: 12/229,443

(22) Filed: Aug. 22, 2008

(65) Prior Publication Data

US 2010/0048110 A1    Feb. 25, 2010

(51) Int. Cl.
*B24B 55/06*    (2006.01)
(52) U.S. Cl. .................................. 451/456; 451/451
(58) Field of Classification Search .............. 451/451, 451/456, 453, 89; 141/65, 93, 97; 408/67; 409/134, 137
See application file for complete search history.

(56) References Cited

U.S. PATENT DOCUMENTS

| | | | | |
|---|---|---|---|---|
| 4,126,081 A | * | 11/1978 | Zdeb | 409/134 |
| 4,514,936 A | * | 5/1985 | Hurtado | 451/28 |
| 4,656,995 A | * | 4/1987 | Merwin | 606/180 |
| 4,813,462 A | * | 3/1989 | Linn | 141/93 |
| 5,971,839 A | * | 10/1999 | Schmelzer | 451/456 |

* cited by examiner

*Primary Examiner* — Dung Van Nguyen

(74) *Attorney, Agent, or Firm* — Charles E. Baxley

(57) ABSTRACT

A dust-disposal assembly for a machine tool comprises a dust-collection chamber settled in a cutting area of the machine tool and a dust-block board settled on the dust-collection chamber for covering an opening of the dust-collection chamber, wherein the dust-block board serves to retain cutting dust in the dust-collection chamber.

6 Claims, 6 Drawing Sheets

DUST-DISPOSAL ASSEMBLY FOR MACHINE TOOL

BACKGROUND OF THE INVENTION

1. Technical Field

The present invention relates to a dust-disposal assembly applied to machine tools and serves to prevent cutting dust produced in a cutting process from distributing over the air.

2. Description of Related Art

It is known that some materials, such as graphite, wood, composite materials, ceramics and so on, when being machined by a machine tool, tend to generate considerable quantities of cutting dust that is of very fine and very hard particles. If the machine tool is not equipped with a competent dust-disposal assembly, such cutting dust can intrude into the machine tool and may damage machine parts or break circuits in the machine tool.

One conventional dust-proof approach is employing a round water curtain that surrounds the cutting area of the machine tool so that cutting dust of the machine tool can be enclosed by the water curtain from escaping and distributing outward. Then the water flowing from the water curtain and containing the cutting dust is collected, filtered and reused. The conventional dust-proof approach however has some defects.

First, if the water flow is not properly controlled, it may be too strong and damage the workpiece.

Second, the cutting dust will deposit in the water tank and is difficult to clean.

Third, this conventional dust-proof approach is inapplicable when the workpiece must be kept dry (such as graphite parts used in semi-conductor manufacturing process).

An alternative dust-proof solution is dry dust collection. As shown in FIG. 1, a dust-collection pipe 80 is provided beside and moves simultaneously with a spindle of a machine tool. Cutting dust of a workpiece machined by the machine tool thus is collected by the dust-collection pipe 80 and is then filtered in a filtering system. Nevertheless, such dry dust collection suffers from some drawbacks.

Because the dust-collection pipe can not touch the workpiece neither can it cause any obstruction to the automatic tool change process of the machine tool, the dust-collection pipe and its air inlet must remain distant from the spindle and cutting point, resulting in limited dust collecting effect.

Second, when a long cutting tool is used, the air inlet of the dust-collection pipe is even further from the cutting point, causing the dust collecting effect further inferior.

Third, since the cutting area is an open space while air flows faster at a location near the air inlet and flows slower at a location far from the air inlet, the cutting dust far from the air inlet can less or can even not be effectively collected and may then distribute over the open space.

One more conventional dust-proof solution is to use a dust-collection chamber. As can be seen in FIG. 2, a dust-collection chamber 81 is installed in a cutting area of a machine tool. The dust-collection chamber 81 has an opening 82 so that a workpiece to be cut can be placed into the dust-collection chamber 81 while a dust-collection pipe 83 is installed on a wall of the dust-collection chamber. Such dust-collection chamber is yet disadvantageous by some reasons.

First, the opening allows cutting dust of the workpiece to escape therefrom and distribute over the air.

Second, since air flows faster at a location near the air inlet and flows slower at a location far from the air inlet, the cutting dust far from the air inlet can be less or even not collected, resulting in inferior dust collecting effect.

Third, when the workpiece is so high that a cutting point thereof is higher than the air inlet, the cutting dust tends to escape from the opening, causing the dust collecting effect incompetent.

SUMMARY OF THE INVENTION

One primary objective of the present invention is to provide a dust-disposal assembly for a machine tool. The dust-disposal assembly serves to collect cutting dust in a cutting area of a machine tool so that a dust-extraction device can efficiently remove the cutting dust from the cutting area, thereby preventing the cutting dust from significantly escaping outward the cutting area.

To achieve the objective of the present invention, the dust-disposal assembly comprises:

a dust-collection chamber provided at a cutting area of a machine tool and formed with an opening;

an extraction pipe settled on a side wall of the dust-collection chamber for connecting a dust-extraction device; and a dust-block board provided on the dust-collection chamber for covering the opening, wherein an interval with a predetermined width exists between the dust-block board and upper edges of walls of the dust-collection chamber in the manner that the dust-collection chamber is movable and the dust-block board is formed with a spindle hole allowing a spindle of the machine tool to pass therethrough.

Thus, the spindle of the machine tool can move into the dust-collection chamber through the spindle hole and machine the workpiece. Cutting dust generated in cutting process can be blocked by the dust-collection chamber and the dust-block board and retained in the dust-collection chamber so that a dust-extraction device can remove the cutting dust from the dust-collection chamber by drawing the cutting dust. The drawing procedure makes the pressure in the dust-collection chamber lower than the pressure outside the dust-collection chamber. Besides, in virtue of the small interval between the dust-block board and the upper edge of the walls of the dust-collection chamber, according to Bernoulli's Equation, air flows very fast at the interval and the high-speed air flow inward the dust-collection chamber further obstructs the cutting dust from escaping out the dust-collection chamber.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENTS

While a preferred embodiment is provided herein for illustrating the concept of the present invention as described above, it is to be understood that the components in these drawings are made for better explanation and need not to be made in scale. Moreover, in the following description, resemble components are indicated by the same numerals.

Figure 1:
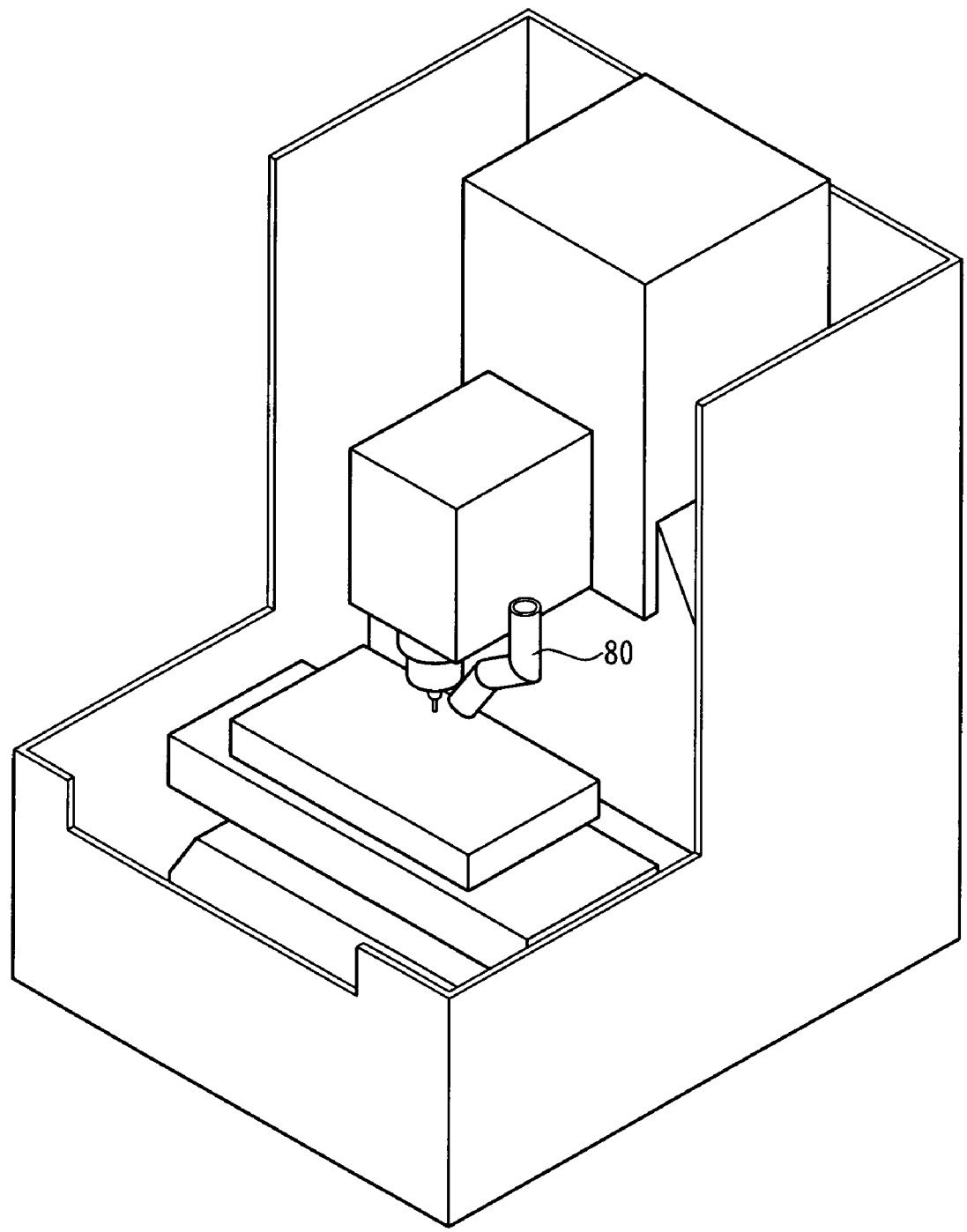
FIG. 1 is a schematic drawing illustrating a device based on a conventional dry dust collection solution.
Figure 2:
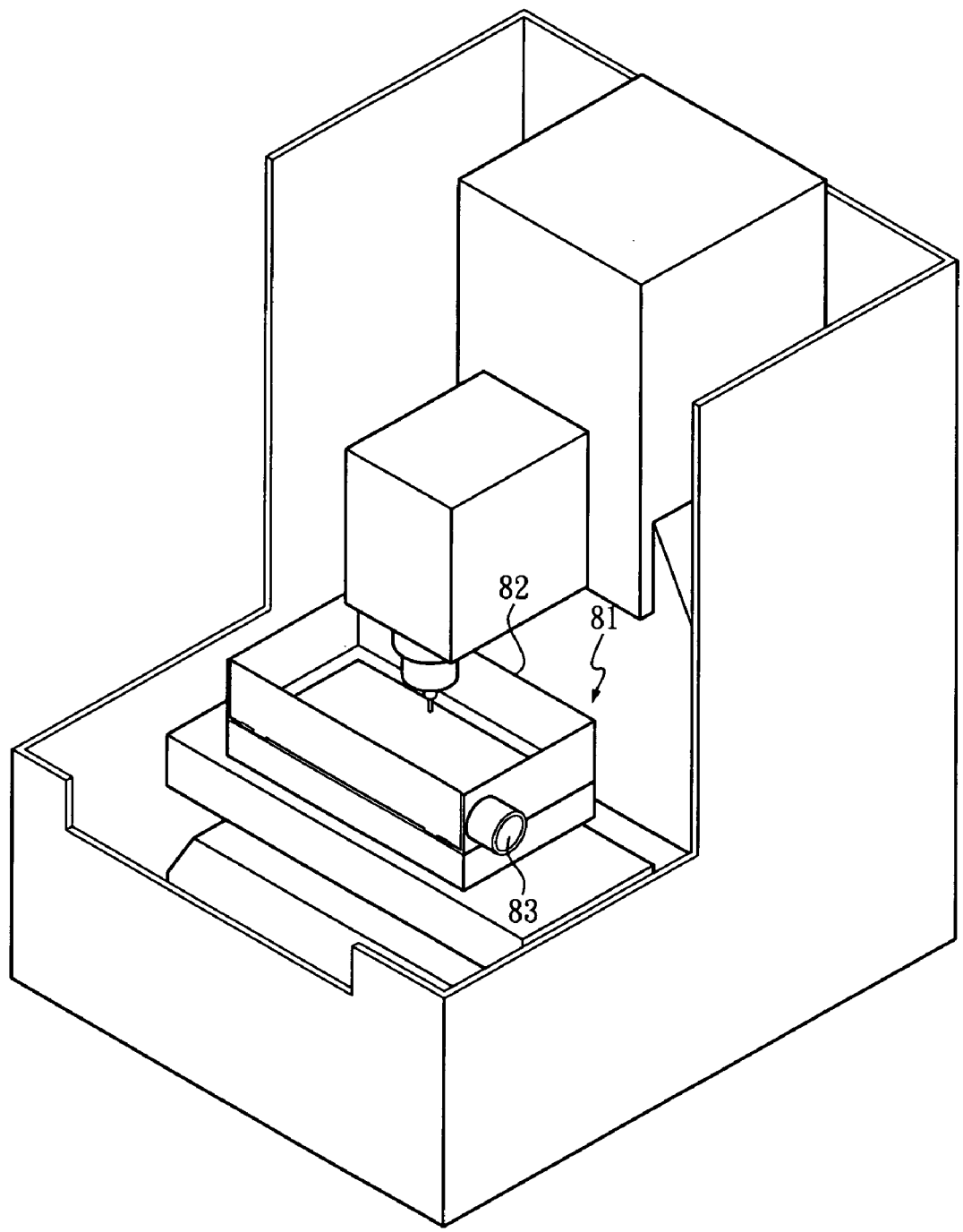
FIG. 2 is a schematic drawing illustrating a device based on a conventional dust-collection chamber solution.
Figure 3:
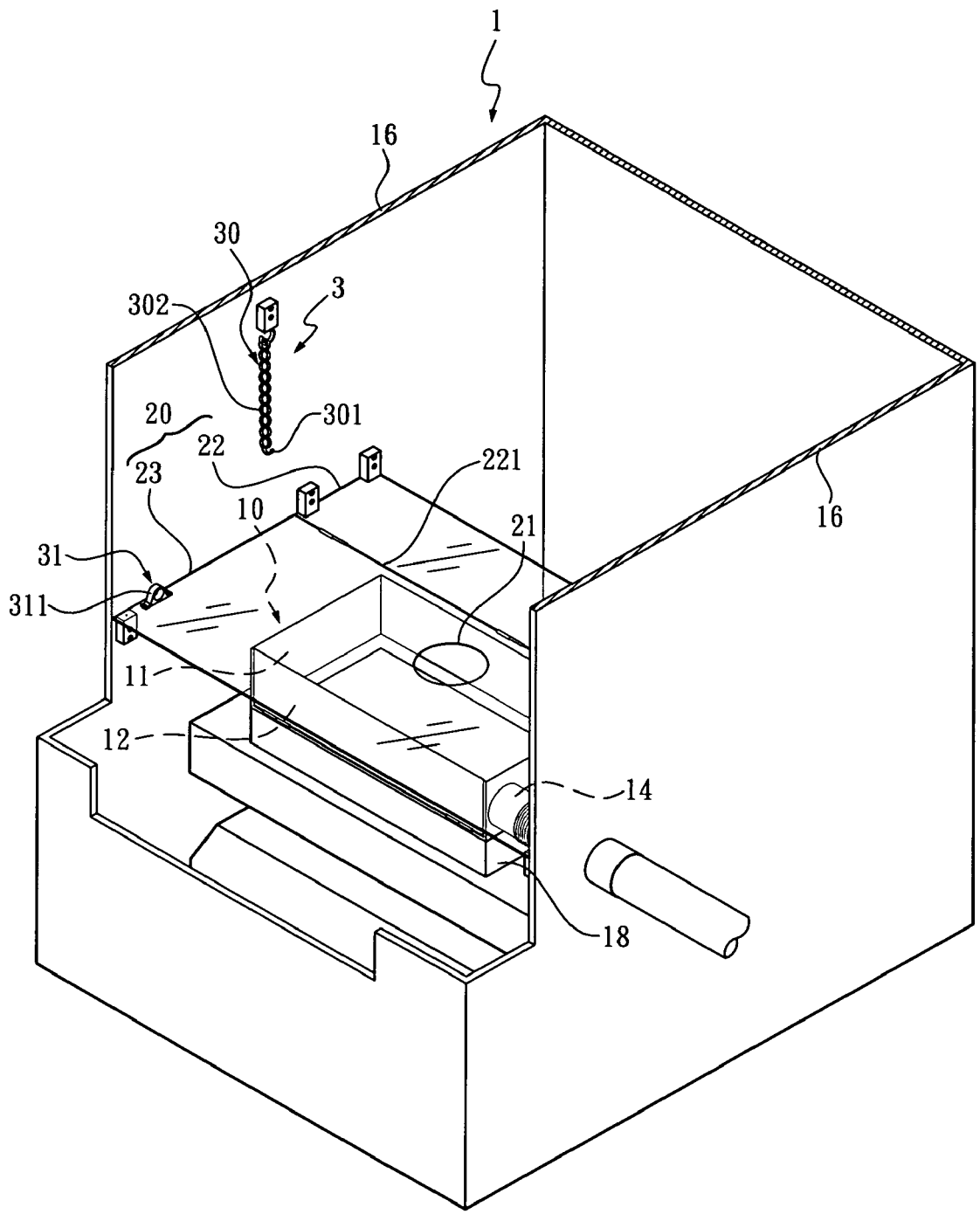
FIG. 3 is a perspective view of a dust-disposal assembly according to the present invention.

As can be seen in FIG. 3, a dust-disposal assembly comprises a dust-collection chamber 10, an extraction pipe 14, and a dust-block board 20.

The dust-collection chamber 10 is settled on a cutting table 18 of a machine tool 1 and has an opening 11 as well as a front-opened board 12. The workpiece is to be put in the dust-collection chamber 10.

The extraction pipe 14 is settled at a side wall of the dust-collection chamber 10 and connecting with a dust-extraction device. The dust-extraction device may be a vacuum device or a draining device. In a case where the vacuum device is used as the dust-extraction device, the extraction pipe 14 vacuums cutting dust in the dust-collection chamber 10, while in a case where the draining device is used as the dust-extraction device, a water curtain as described in the paragraph of the prior arts is implemented so that water in the dust-collection chamber 10 and dust in the water can be drained through the extraction pipe 14.

The dust-block board 20 is provided on the dust-collection chamber 10 for covering the opening 11. The dust-block board 20 may be positioned on any immovable part of the machine tool 1. For instance, the dust-block board 20 shown in the drawings is positioned on side walls of the machine tool 1. There is a very narrow interval between the dust-block board 20 and upper edges of walls of the dust-collection chamber 10 so that when the cutting table 18 moves, the dust-collection chamber 10 on the cutting table 18 will not rub against the dust-block board 20. A spindle hole 21 is formed on the dust-block board 20 for allowing a spindle of the machine tool 1 to pass therethrough. The spindle hole 21 may be designed as any configuration matching one of various types of spindles, such as a round spindle hole for a vertical machine tool or a lengthwise spindle hole for a gantry machine tool. The dust-block board 20 may be a transparent board that allows an operator to observe situation inside the dust-collection chamber 10. Alternatively, the dust-block board 20 may be an opaque board.

The spindle of the machine tool 1 can move into the dust-collection chamber 10 through the spindle hole 21 to machine the workpiece. When the machine tool 1 machines a material, such as graphite, wood, a composite material or ceramics and considerable quantities of cutting dust are generated, the dust-collection chamber 10 and the dust-block board 20 together retains the cutting dust in the dust-collection chamber 10. With cooperation of the extraction pipe 14 and the extraction t device (not shown), the cutting dust in the dust-collection chamber 10 can be drawn and removed from the machine tool 1 without escaping out the dust-collection chamber 10 and randomly distributing over the air. The drawing process makes the pressure in the dust-collection chamber 10 lower than the pressure outside the dust-collection chamber 10. Besides, in virtue of the very narrow interval between the dust-block board 20 and the upper edges of the walls of the dust-collection chamber 10, according to Bernoulli's Equation, air flows very fast at the interval and the high-speed air flow into the dust-collection chamber 10 further obstructs the cutting dust from escaping out the dust-collection chamber 10.

Figure 4:
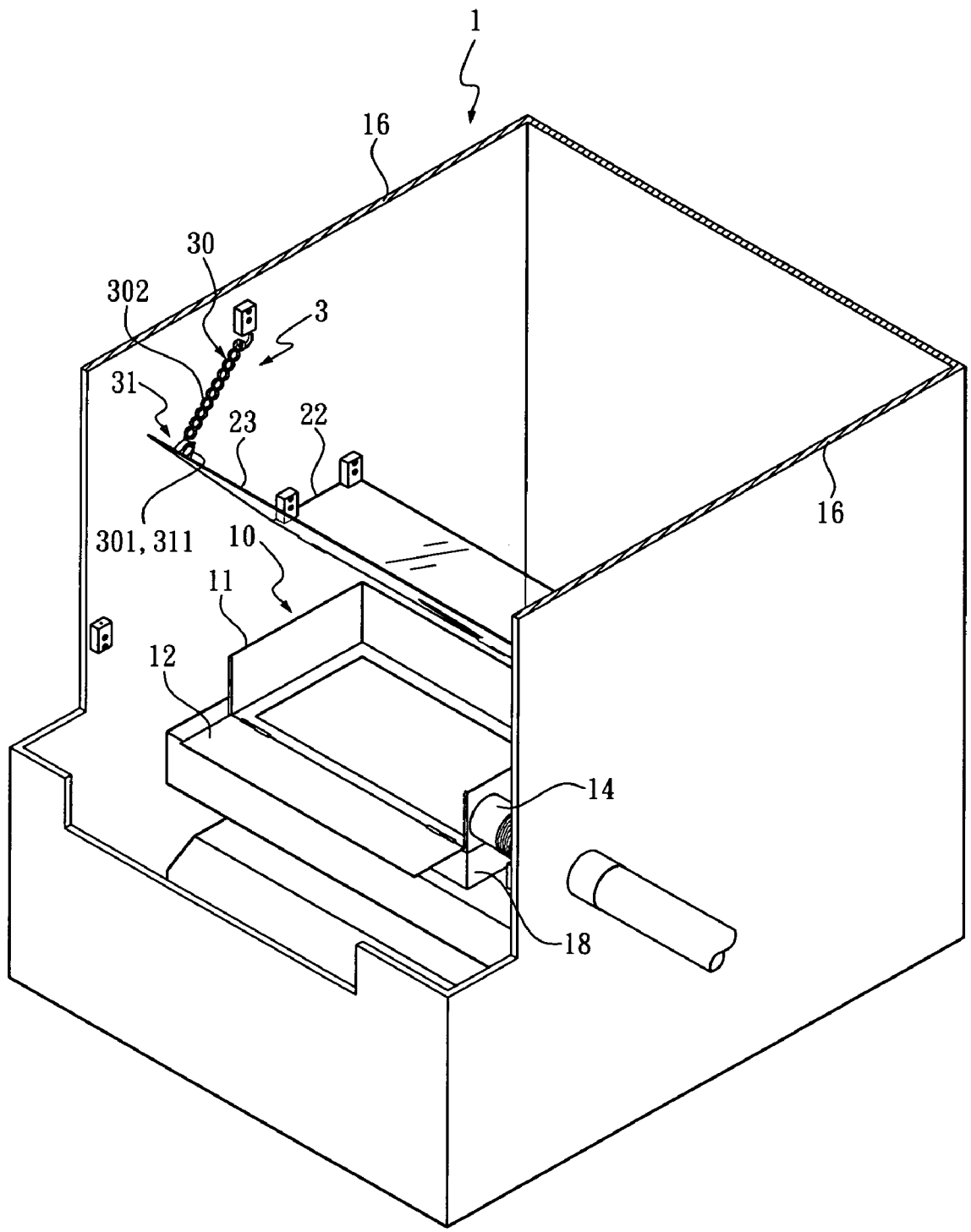
FIG. 4 is a schematic drawing showing a dust-block board of the dust-disposal assembly lifted.

According to the embodiment shown in FIGS. 3 and 4, the dust-block board 20 comprises a first board member 22 and a second board member 23. The first board member 22 is fastened on the side walls 16 or any other immovable part of the machine tool 1 while the spindle hole 21 is formed on the second board member 23. The second board member 23 may be movably connected with a front edge 221 of the first board member 22 by any known means, such as hinges, so as to enable the second board member 23 to pivot with respect to the first board member 22. When the second board member 23 is lain down, it is coplanar with the first board member 22. According to the drawings, a stopper 3 is further provided for positioning the second board member 23 at a lifted position thereof. The stopper 3 includes a first hook member 30 settled on the side wall or another immovable part of the machine tool 1 and a second hook member 31 provided on the second board member 23. The second board member 23 can be manually lifted so that the first hook member 30 and the second hook member 31 can hook mutually to position the lifted second board 23. Afterward, the front-opened board 12 of the dust-collection chamber 10 can be also opened to allow the workpiece to be easily put in or taken out. The first hook member 30 may be including, but not limited to, a chain 302 attached by a hook 301 as depicted in the drawings while the second hook member 31 may be including, but not limited to, a ring 311 for being engaged by the hook 311 as depicted in the drawings.

Figure 5:
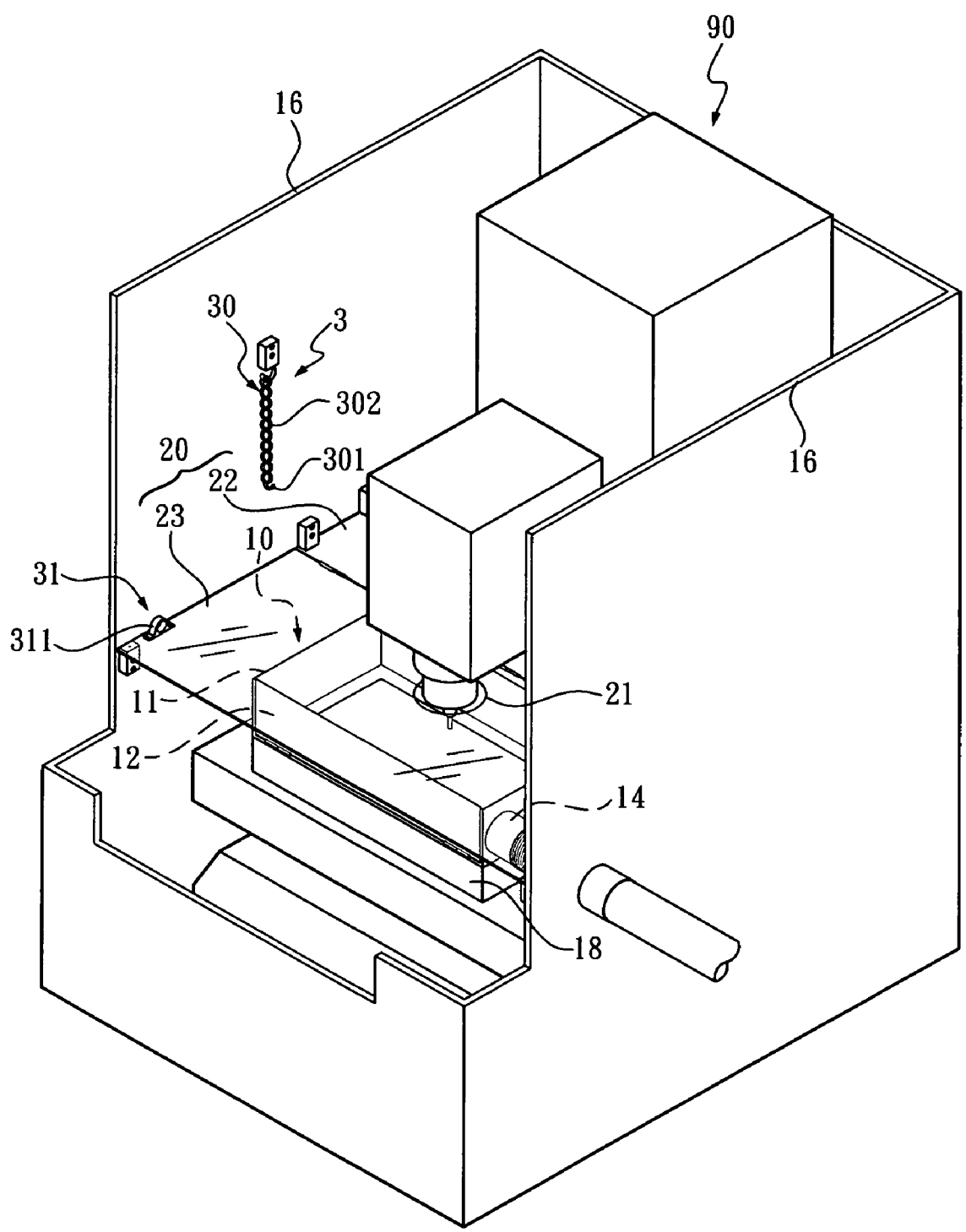
FIG. 5 is a schematic drawing showing the dust-disposal assembly of the present invention applied to a vertical machine tool in a machining process.
Figure 6:
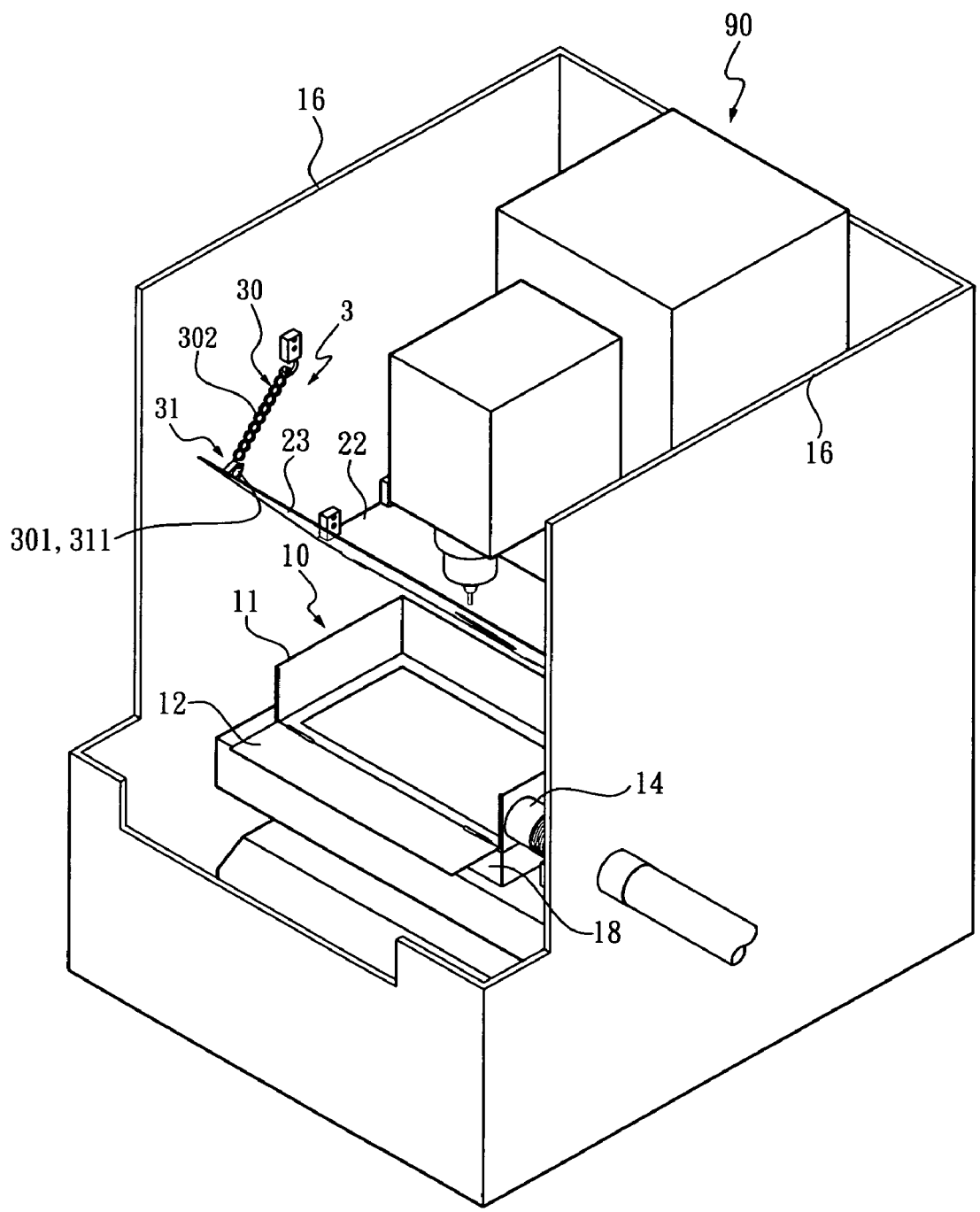
FIG. 6 is a schematic drawing showing the dust-disposal assembly of the present invention applied to the vertical machine tool being idle while the dust-block board is lifted.

Referring to FIG. 5, therein, the dust-block board 20 is applied to a vertical machine tool 90. The spindle of the machine tool 1 moves into the dust-collection chamber 10 through the spindle hole 21 to machine a workpiece. As can be seen in FIG. 6, before the second board 23 is lifted, the spindle of the machine tool 1 has to be raised to a non-operation position thereof so as to be secured from impacting the second board 23 later lifted.

Although the particular embodiment of the invention has been described in detail for purposes of illustration, it will be understood by one of ordinary skill in the art that numerous variations will be possible to the disclosed embodiment without going outside the scope of the invention as disclosed in the claims.

What is claimed is:

1. A dust-disposal assembly for a machine tool, comprising:

a dust collection chamber, settled in a cutting area of a machine tool and having an opening;

an extraction pipe, settled on a side wall of the dust-collection chamber for connecting a dust-extraction device; and a dust-block board, provided on the dust-collection chamber for covering the opening, wherein an interval with a predetermined width exists between the dust-block board and upper edges of walls of the dust-collection chamber in a manner that the dust-collection chamber is movable and the dust-block board is formed with a spindle hole allowing a spindle of the machine tool to pass therethrough, wherein the dust-block board comprises a first board member and a second board member, in which the first board member is fastened to an immovable part of the machine tool while the second board member that is formed with the spindle hole is movably connected with a front edge of the first board member; and a stopper for positioning the second board member at a lifted position thereof.

2. The dust-disposal assembly of claim 1, wherein the spindle hole is of a round shape.

3. The dust-disposal assembly of claim 1, wherein the dust-block board is a transparent board.

4. The dust-disposal assembly of claim 1, wherein the stopper comprises a first hook member settled on an immovable part of the machine tool and a second hook member provided on the second board member so that when the first hook member and the second hook member are engaged mutually, the lifted second board is positioned.

5. The dust-disposal assembly of claim 4, wherein the first hook member is a chain attached by a hook while the second hook member is a ring designed to be engaged by the hook on the chain.

6. The dust-disposal assembly of claim 1, wherein the dust-collection chamber has a side board that can be opened or closed.

* * * * *